US006938654B2

(12) United States Patent
Gershtein et al.

(10) Patent No.: US 6,938,654 B2
(45) Date of Patent: Sep. 6, 2005

(54) MONITORING OF ULTRA-HIGH PURITY PRODUCT STORAGE TANKS DURING TRANSPORTATION

(75) Inventors: Vladimir Yliy Gershtein, Allentown, PA (US); Robert William Ford, Schnecksville, PA (US); John Frederick Cirucci, Schnecksville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 158 days.

(21) Appl. No.: 10/680,267

(22) Filed: Oct. 6, 2003

(65) Prior Publication Data

US 2004/0065382 A1 Apr. 8, 2004

Related U.S. Application Data

(63) Continuation-in-part of application No. 10/101,340, filed on Mar. 19, 2002, now Pat. No. 6,651,703.

(51) Int. Cl.[7] .............................................. B65B 1/04
(52) U.S. Cl. ..................... 141/231; 141/311 A; 141/64; 141/86; 137/350; 220/1.5
(58) Field of Search ............................... 141/311 A, 86, 141/64, 65, 66, 231; 220/1.5, 4.12, 661; 137/588, 347, 350, 312, 381, 382; 73/49.2, 49.3, 46

(56) References Cited

U.S. PATENT DOCUMENTS

| | | | |
|---|---|---|---|
| 1,897,161 A | 2/1933 | Endacott | |
| 2,015,904 A | 10/1935 | Marsh et al. | 220/3 |
| 2,354,438 A | 7/1944 | Craig | 280/5 |
| 3,129,730 A | 4/1964 | Simon | 141/286 |
| 4,685,327 A | 8/1987 | Sharp | 73/49.2 |
| 4,834,137 A * | 5/1989 | Kawaguchi et al. | 137/557 |
| 4,958,957 A | 9/1990 | Berg et al. | 405/55 |
| 4,986,436 A | 1/1991 | Bambacigno et al. | 220/86 |
| 5,016,689 A | 5/1991 | McGarvey et al. | 141/198 |

(Continued)

FOREIGN PATENT DOCUMENTS

| | | | |
|---|---|---|---|
| EP | 0624752 | 1/1996 | F17C/1/00 |
| EP | 0969242 | 1/2000 | F17C/1/00 |
| EP | 0969243 | 1/2000 | F17C/1/00 |
| WO | 98/57096 | 12/1998 | F17C/13/06 |

OTHER PUBLICATIONS

Chlorine Institute Emergency Kit "C", Chlorine Institute catalog "Chlorine Safety and Hazmat Emergency Equipment", section "C–Kit Design Features". Can also be found on the web site http://www.chlorinesafety.com/clequip.htm, no date.

*Primary Examiner*—Steven O. Douglas
(74) *Attorney, Agent, or Firm*—Geoffrey L. Chase

(57) ABSTRACT

System for the transportation and storage of a product which comprises a tank including cylindrical wall section and two ends, wherein the cylindrical wall section and two ends define a cylindrical tank periphery, and wherein the tank periphery has an interior and an exterior. The system utilizes a valve box that includes one or more side walls, a bottom wall, and a removable, sealable top cover which can be attached to the one or more side walls to seal the valve box, wherein the valve box side walls are sealably joined to the cylindrical wall. One or more process valves are disposed in the valve box, wherein each valve has a first and a second end, wherein each first end is connected to a pipe which passes through a wall of the valve box for introducing product into the tank or withdrawing product from the tank. A purge valve and pressure measurement means are installed in fluid communication with the valve box. The product in the tank is isolated from the atmosphere surrounding the tank when the valve box is sealed.

25 Claims, 5 Drawing Sheets

U.S. PATENT DOCUMENTS

| | | | |
|---|---|---|---|
| 5,071,166 A | 12/1991 | Marino | 280/230 |
| 5,188,252 A | 2/1993 | Gerhard | 220/1.5 |
| 5,211,202 A | 5/1993 | Zink et al. | 137/350 |
| 5,673,562 A | 10/1997 | Friedt | 62/48.1 |
| 5,996,827 A | 12/1999 | Splane | 220/1.5 |
| 6,003,540 A * | 12/1999 | Bruni et al. | 137/312 |
| 6,032,483 A | 3/2000 | Paganessi et al. | 62/620 |
| 6,089,027 A | 7/2000 | Wang et al. | 62/46.1 |
| 6,101,816 A | 8/2000 | Wang et al. | 62/48.1 |
| 6,122,931 A | 9/2000 | Paganessi et al. | 62/620 |
| 6,651,703 B2 * | 11/2003 | Gershtein et al. | 141/64 |
| 6,742,550 B2 * | 6/2004 | Caparros | 141/86 |

* cited by examiner

MONITORING OF ULTRA-HIGH PURITY PRODUCT STORAGE TANKS DURING TRANSPORTATION

CROSS-REFERENCE TO RELATED APPLICATIONS

This application is a Continuation-In-Part of Ser. No. 10/101,340 filed on Mar. 19, 2002, now U.S. Pat. No. 6,651,703 which is incorporated herein by reference.

BACKGROUND OF THE INVENTION

The safe transportation and storage of hazardous, high purity and ultra-high purity products are important in the manufacture of specialized components in the electronics and related industries. These transportation and storage procedures must meet all safety and environmental regulations set by government agencies in the countries and jurisdictions involved. In addition, transportation and storage methods must maintain the high and ultra-high purity requirements of the manufacturers that utilize these products.

Some of these products are used in moderate quantities and can be transported and stored in standard cylinders, for example, as compressed liquefied gases. As the demand for such high purity and ultra-high purity products grows, it becomes desirable to ship the products in larger, bulk containers which can be handled by standard modular shipping methods via truck, rail, ship, and air. As such containers become larger, the prevention of leaks and accidental emissions becomes correspondingly more important.

Modular transportation of these products in large volumes can be facilitated by mounting storage tanks within standard-sized structural frames which can be loaded and unloaded using standard cranes and lifts, and which can be shipped by standard modular shipping methods. It is desirable to maximize the volume of product in the tanks which are mounted in these standard-sized structural frames while meeting the safety, environmental, and product purity requirements associated with these shipping methods. There also is a need to monitor potential contamination of the products in the tanks during transportation from a filling location to an end user location. These needs are met by the transportation and storage system of the present invention as described below and defined by the claims that follow.

BRIEF SUMMARY OF THE INVENTION

An embodiment of the invention relates to a system for the transportation and storage of a product comprising a tank including a cylindrical wall section and two ends, wherein the cylindrical wall section and two ends define a cylindrical tank periphery, and wherein the tank periphery has an interior and an exterior. The system includes a valve box comprising one or more side walls, a bottom wall, and a removable, sealable top cover which can be attached to the one or more side walls to seal the valve box, wherein the valve box side walls are sealably joined to the cylindrical wall. One or more process valves are disposed in the valve box, wherein each valve has a first and a second end, wherein each first end is connected to a pipe which passes through a wall of the valve box for introducing product into the tank or withdrawing product from the tank. The system also includes a purge valve and pressure measurement means in fluid communication with the valve box. The product in the tank is isolated from the atmosphere surrounding the tank when the valve box is sealed.

The valve box may be at least partially recessed and may be at least partially disposed in the interior of the tank periphery. The valve box cover, when attached to the one or more side walls of the valve box to form a sealed valve box, may be disposed at the tank periphery or may be exterior to the tank periphery.

The sealed valve box preferably is isolated from the atmosphere surrounding the tank and may include temperature measurement means for determining the temperature in the valve box.

Typically, the valve box is cylindrical and has a circular bottom wall, a circular top cover, and a cylindrical center portion forming a single side wall. The purge valve may be connected to a sealable closure which can be connected to a fill line for introducing purge gas into the valve box. The maximum allowable working pressure of the valve box when sealed may be equal to or greater than the maximum allowable working pressure of the tank.

Each second end of the one or more process valves may be connected to a sealable closure which can be connected to a fill line for introducing product into the tank from an external source, connected to a withdrawal line for withdrawing product from the tank for external use, or sealed closed for transportation or storage of the product in the tank. Each sealable closure may be disposed in the valve box and within the tank periphery. The tank may contain product in coexisting liquid and vapor phases, wherein a fill line may be adapted for introducing liquid into the tank and a withdrawal line is adapted for withdrawing vapor from the tank.

The tank may contain a product selected from the group consisting of ammonia, chlorine, hydrogen chloride, trichlorosilane, silicon tetrachloride, and methyltrichlorosilane. Alternatively, the tank may contain a solid particulate component and gas, wherein the fill line is adapted for introducing a mixture of the solid particulate component and gas into the tank and the withdrawal line is adapted for withdrawing a mixture of the solid particulate component and gas from the tank. In another alternative, the tank may contain a slurry of a solid particulate component and a liquid component, wherein the fill line is adapted for introducing a slurry of the solid particulate component and the liquid component into the tank and the withdrawal line is adapted for withdrawing a slurry of the solid particulate component and the liquid from the tank.

The axis of the tank may be generally horizontal, the tank has a top and a bottom, the valve box may be disposed in the top of the tank, and a pipe may be connected to the first end of a valve to form a dip tube which extends through and downward from the valve box to a location adjacent the bottom of the tank.

The system may further comprise a rigid framework surrounding the tank and valve box, wherein the framework is attached to and supports the tank, and wherein the framework defines a periphery which encloses the periphery of the tank. The valve box may be disposed within the periphery of the rigid framework.

The system may further comprise analytical means for analyzing fluid withdrawn from the valve box when the valve box is sealed or for analyzing fluid in situ in the valve box when the valve box is sealed.

In another embodiment, the invention includes a method for the transportation of a product, which method comprises:
(a) providing a system which comprises
 (1) a tank including a cylindrical wall section and two ends, wherein the cylindrical wall section and two ends define a cylindrical tank periphery, and wherein the periphery has an interior and an exterior;

(2) a valve box including one or more side walls, a bottom wall, and a removable and sealable top cover which can be attached to the one or more side walls to form a sealed valve box, wherein the valve box side walls are sealably joined to the cylindrical wall section;

(3) one or more process valves disposed in the valve box, wherein each valve has a first and a second end, wherein each first end is connected to a pipe which passes through a wall of the valve box for introducing product into the tank or withdrawing product from the tank, and wherein product in the tank is isolated from the atmosphere surrounding the tank when the valve box is sealed; and (4) a purge valve and pressure measurement means in fluid communication with the valve box;

(b) introducing product into the tank through at least one of the one or more process valves, through a pipe connected to the first end of the process valve, which pipe passes through the wall of the valve box and into the tank;

(c) closing the one or more process valves, thereby isolating the product in the tank at a product pressure, and attaching the sealable top cover to the one or more side walls of the valve box;

(d) at a first time, purging the valve box with a purge gas, pressurizing the valve box to a pressure between the product pressure and atmospheric pressure, closing the purge valve, and measuring and recording the pressure in the valve box; and (e) at a second time later than the first time, measuring the pressure in the valve box and comparing the pressure at the second time to the pressure in the valve box measured in (d) at the first time.

The system used in this method may further comprise a rigid framework surrounding the tank and valve box, wherein the framework is attached to and supports the tank, and wherein the framework defines a periphery which encloses the periphery of the tank. The valve box may be disposed within the periphery of the rigid framework.

The method may further comprise transporting the system from a first location to a second location during a time period between the first time and the second time. The method may further comprise measuring the temperature in the valve box at the first and second locations, correcting the pressure at the second location to yield a temperature-corrected pressure at the second location, and comparing the temperature-corrected pressure at the second location with the pressure measured at the first location.

When the temperature-corrected pressure in the valve box at the second location is greater than the pressure measured in the valve box at the first location, the system may be transported from the second location to the first location. When the temperature-corrected pressure in the valve box at the second location is less than the pressure measured in the valve box at the first location, the fluid in the valve box may be analyzed, and if the fluid in the valve box contains product, the system may be transported from the second location to the first location. When the temperature-corrected pressure in the valve box at the second location is essentially equal to the pressure measured in the valve box at the first location, the fluid in the valve box may be analyzed, and if the fluid in the valve box contains product, the system may be transported from the second location to the first location.

DETAILED DESCRIPTION OF THE INVENTION

The invention relates to a system and method for the transportation of products which must be isolated from the atmosphere and maintained in a state of high purity or ultra-high purity. These products may be environmentally harmful and in such cases isolation from the atmosphere is particularly important. The system can be adapted for modular transportation of these products in large volumes by mounting storage tanks within standard-sized structural frames. The system can be described as a bulk container which can be loaded, shipped, and unloaded using standard modular shipping methods via truck, rail, and ship.

Figure 1:
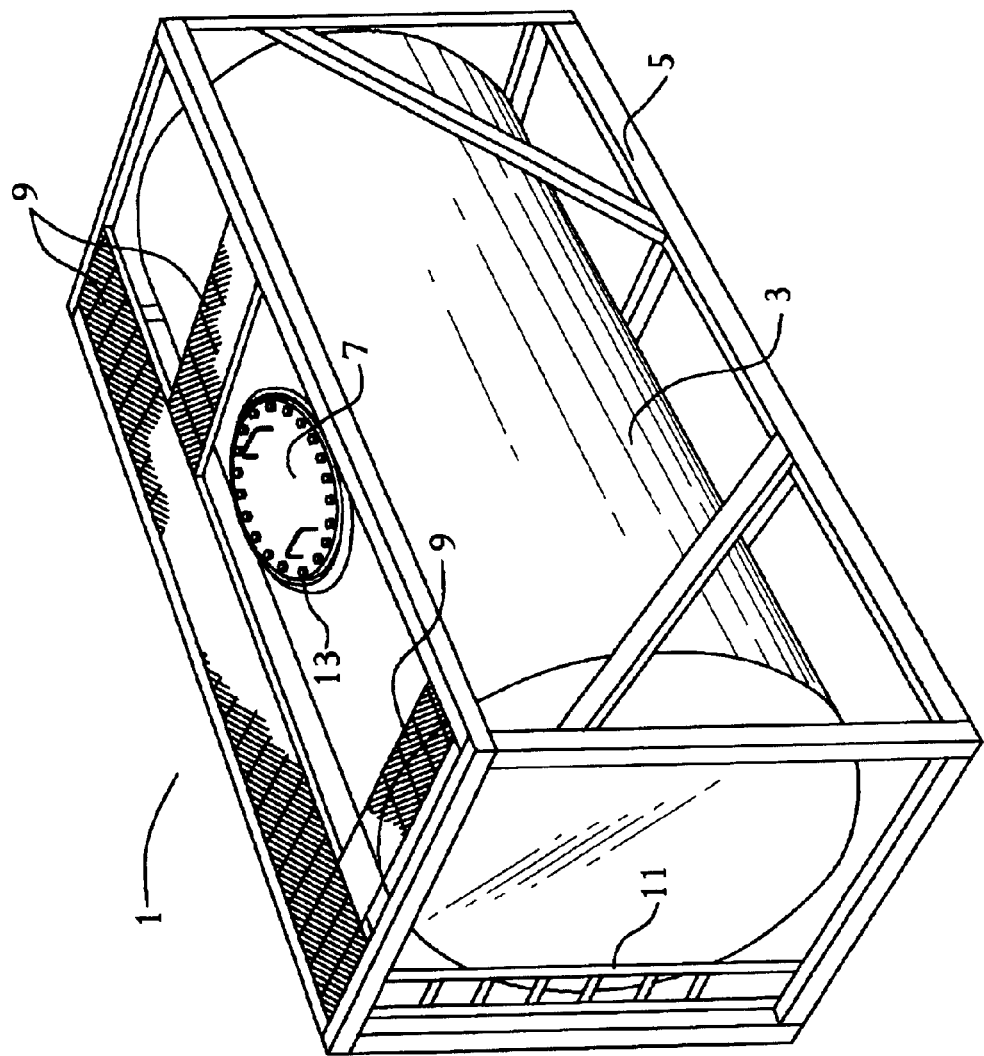
FIG. 1 is an isometric drawing of an exemplary modular transportation and storage system of the present invention.
Figure 2:
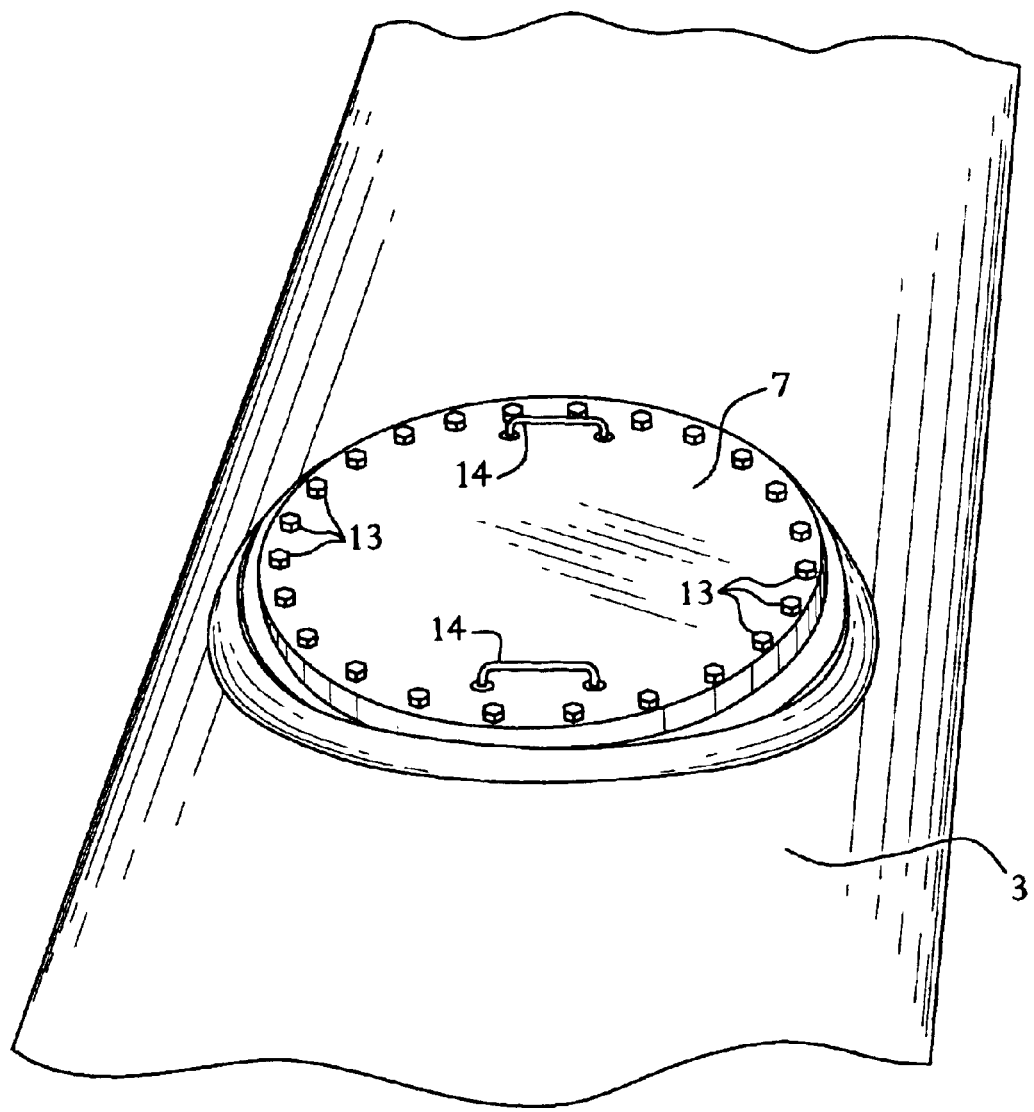
FIG. 2 is a partial view of the top portion of the system of FIG. 1.

Schematic isometric drawings of an exemplary embodiment of the invention are given in FIGS. 1 and 2. Modular tank and frame system 1 comprises tank assembly 3 mounted and fixed within structural framework 5 (FIG. 1) which is designed to support the tank assembly and allow safe loading, shipping and unloading by standard industry methods. Structural framework 5 may be fitted with lifting lugs or other attachments (not shown) which allow the entire system 1 to be lifted and moved during loading and unloading, as well as attached to transportation means such as truck trailers or rail cars.

Removable top cover 7 seals a valve box disposed within the periphery of framework 5 and disposed partially or completely within the periphery of tank assembly 3. Valves and sealable connections utilized for filling and withdrawal of product are located in the valve box as described later. Framework 5 may be fitted with catwalks 9 and ladder 11 for access to top cover 7. Modular tank and frame system 1 preferably is constructed using the specifications and standard dimensions required by government and shipping industry organizations such as the United States Department of Transportation (DOT) and the International Organization for Standardization (ISO). For example, the dimensions of modular tank and frame system 1 as defined by the periphery of framework 5 may be in accordance with the ISO standard shipping container dimensions of 20 ft×8 ft×8 ft 6 in high.

The use of top cover 7 and the valve box disposed within the periphery of framework 5 allows modular tank and frame system 1 to meet all safety and environmental regulations set by government agencies in the countries and jurisdictions involved. In addition, it ensures that high and ultra-high purity product requirements are met during both transportation and storage of modular tank and frame system 1.

Modular tank and frame system 1 should be fabricated using methods and materials specified by the appropriate government and shipping industry organizations. Tank 3 should be fabricated of appropriate known alloys to ensure both corrosion resistance and product purity requirements, and optionally may be lined with appropriate materials to meet these requirements. The maximum allowable working pressure of tank 3 as defined by the American Society of Mechanical Engineers (ASME) or the United States Department of Transportation (DOT) may be as high as 500 psia.

Top cover 7 is installed using appropriate gasket materials and a plurality of threaded bolts 13 around the periphery of the circular cover. This allows the valve box to be sealed during transportation and storage, and opened during filling and product withdrawal operations. Handles 14 (FIG. 2) allow cover 7 to be lifted and moved during tank opening and closing operations. Preferably, the maximum allowable working pressure of the valve box with top cover 7 installed and sealed is equal to or greater than the maximum allowable working pressure of tank 3. This ensures that any leakage of the valves or sealable connections within the valve box during transportation and storage is contained until tank and frame system 1 can be transported to a safe location for repair. If any damage to the valves or sealable connections occurs during filling or product withdrawal operations, top cover 7 can be installed and sealed immediately. When the maximum allowable working pressure of the valve box sealed by top cover 7 is equal to or greater than the maximum allowable working pressure of tank 3, tank and frame system 1 can be transported immediately to a safe location for repair without requiring an exemption from transportation authorities such as DOT.

Tank and frame system 1 can be utilized to transport and store a wide variety of products, wherein a product may be defined as a fluid or a flowable material which comprises one or more components present in two or more coexisting phases. In one embodiment, the system may be used for pressurized liquefied gases such as ammonia, chlorine, hydrogen chloride, trichlorosilane, silicon tetrachloride, and methyltrichlorosilane. In this application, product may be loaded into tank 3 as a liquid and later withdrawn as a vapor while the liquid vaporizes in the tank. Alternatively, liquid could be transferred to another tank under pressure in a transfill operation.

In another embodiment, the tank may be used for a solid particulate component which is introduced into the tank and withdrawn from the tank as a gas-solid suspension. Examples of such solid particulates may include graphite, carbon, and powdered metals and the gas may be selected from air, nitrogen, argon, and natural gas. In yet another embodiment, the tank may be used for a slurry of a solid particulate component in a liquid component.

Figure 3:
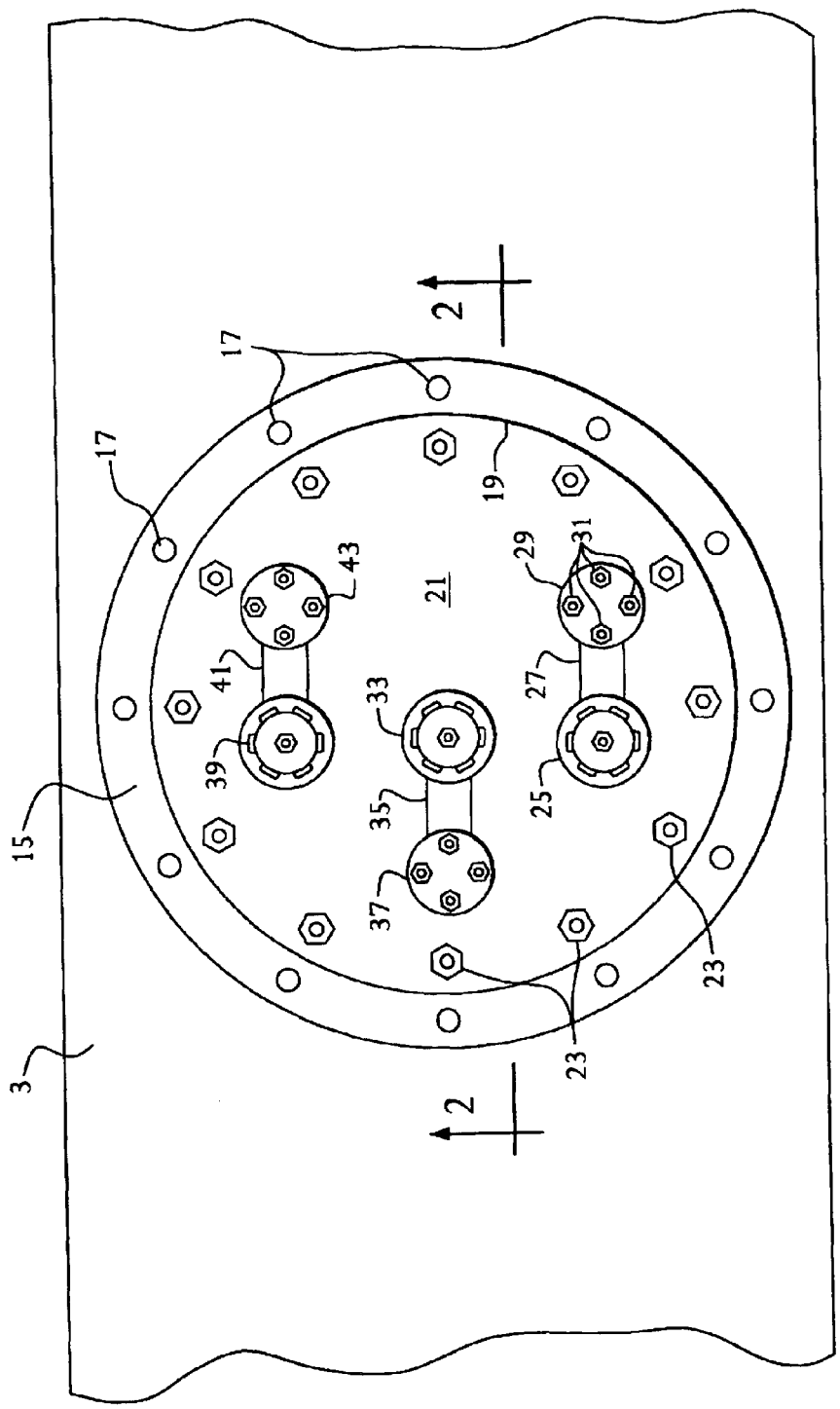
FIG. 3 is a top view of an exemplary recessed valve box which may be mounted in the system of FIG. 1.

A top view of the valve box with top cover 7 removed is illustrated in one embodiment as shown in FIG. 3. Flange or flange section 15 typically is welded to the upper wall area of tank 3 to form an integral part of the tank assembly. A plurality of threaded bolt holes 17 may be formed in the flange to receive threaded bolts 13 (FIGS. 1 and 2) which seal top cover 7 to the flange when the valve box is sealed. Other types of closures may be used as long as these closures are located within the periphery of framework 5.

Figure 4:
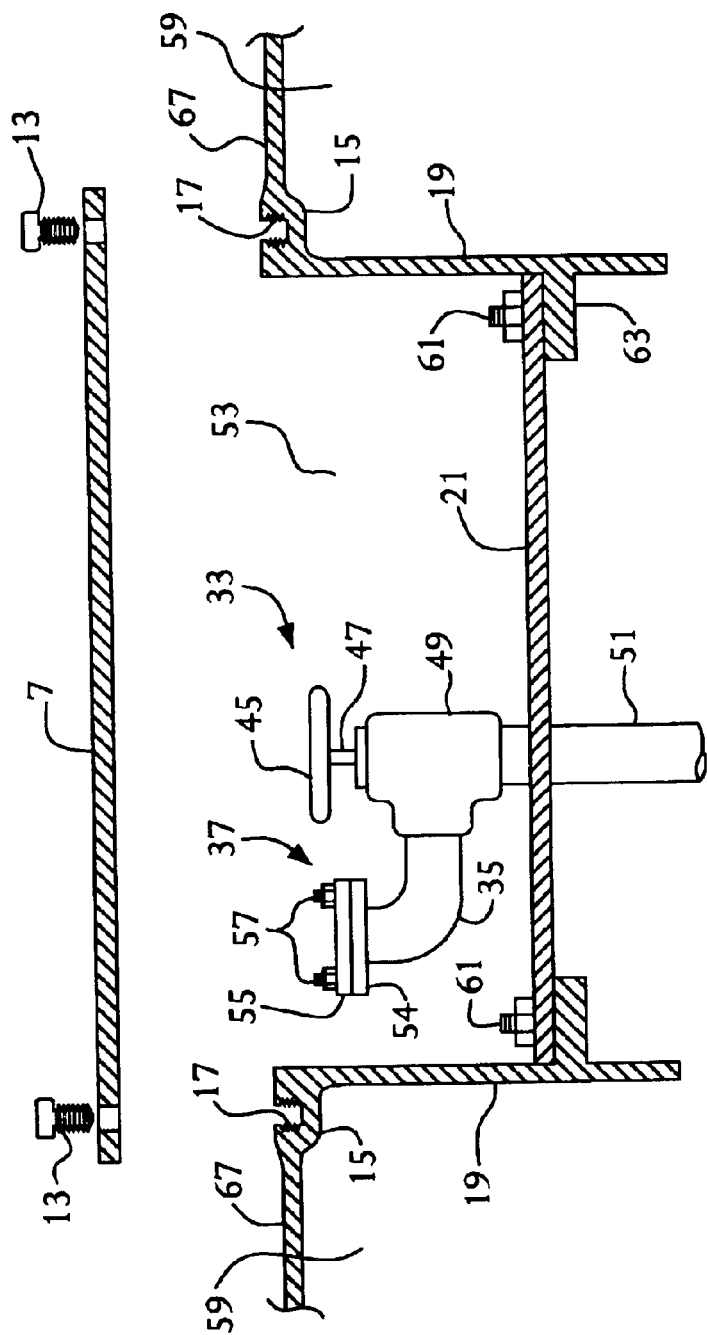
FIG. 4 is a section of FIG. 3 showing an exemplary valve and sealable closure assembly installation.

The interior of the valve box is defined by cylindrical side wall 19 and bottom wall 21 as shown in FIG. 4. Bottom wall 21 may be attached by plurality of bolts 23 (FIG. 3) to a circular bracket or ring (described later) which is part of side wall 19. Valve 25 typically comprises a handwheel (which is seen in this top view), a valve body which is located below the handwheel (and is not seen in this top view), and the usual valve internals including a valve stem, threads, packing, and seat. Alternatively, the valve may be operated by a pneumatic operator rather than a hand wheel. This valve may be a well-known type of valve described as an angle valve in which the two inlet/outlet ports define an included angle of 90 degrees. In this embodiment, one valve port is oriented downward and the other is oriented horizontally as described in more detail below. The horizontally-oriented valve port is connected to one end of pipe section 27 which is a short piece of pipe having a generally 90 degree bend. The other end of pipe section 27 is oriented upward and is connected to flange assembly or sealable closure 29. The downward-oriented port of valve 25 typically is connected to a section of pipe which passes through bottom wall 21 into the interior of tank 3. This section of pipe may be welded or flanged to bottom wall 21.

Alternatively, valve 25 may be a bellows-type valve and may be pneumatically operated. Valve configurations other than the angle configuration discussed above may be used with appropriate piping.

As shown, sealable closure 29 is sealed by a flange and gasket attached by flange bolts 31. When sealed, sealable closure 29 can withstand a maximum allowable working pressure equal to or greater than the maximum allowable working pressure of tank 3. When valve 25 and sealable closure 29 are open, product can be introduced therethrough into tank 3 or withdrawn therethrough from tank 3 by attaching appropriate fill and withdrawal lines to sealable closure 29. Additional and optional valve 33, pipe section 35, and sealable closure 37, which may be similar or identical to valve 25, pipe section 35, and sealable closure 29, respectively, also may be used for either product fill or product withdrawal. Additional and optional valve 39, pipe section 41, and sealable closure 43, which may be similar or identical to valve 25, pipe section 35, and sealable closure 29, respectively, also may be used for either product fill or product withdrawal. Typically, additional valves 33 and 39 each have a downward-oriented port connected to a section of pipe which passes through bottom wall 21 into the interior of tank 3, and this section of pipe is welded to bottom wall 21.

At least one valve is needed for fill and withdrawal of product from tank 3, but typically more than one valve is used. In one embodiment, the downward-oriented port of valve 33 may be connected to a section of pipe which passes downward through bottom wall 21 to a point near the bottom of the interior of tank 3. This section of pipe, known as a dip tube, may be used to introduce liquid into or withdraw liquid from the tank. Each of the downward-oriented ports of valves 25 and 39 may be connected to a piping assembly which passes downward through bottom wall 21 and into the upper portion of tank 33. This embodiment can be used, for example, when the product is a pressurized liquefied gas. In this example, the tank is filled with liquid through sealable closure 37, pipe segment 35, valve 33, and the section of pipe which passes downward through bottom wall 21 to a point near the bottom of the interior of tank 3. Vapor product is withdrawn from the tank through either or both of the sealable closures 31 and 43, pipe segments 27 and 41, valves 25 and 39, and the piping assembly which passes downward through bottom wall 21 and into the upper portion of tank 3.

While the valve box described above with reference to FIGS. 1–4 has a circular cross section, other shapes may be used. For example, the valve box cross section may be square or rectangular if necessary to meet certain piping and valve design requirements.

The orientation of an exemplary valve, pipe segment, and sealable closure in the valve box is illustrated by section 2—2 of FIG. 4. This section is shown in FIG. 4 which includes valve 33, pipe segment 35, and sealable closure 37. Valve 39, pipe segment 41, and closure 43, which lie behind valve 33, pipe segment 35, and sealable closure 37, are not shown in FIG. 4 for the sake of clarity. Valve 33 includes hand wheel 45, stem 47, and valve body 49. As explained above, in one embodiment this is an angle valve with one port connected to pipe segment 51 which passes through and is welded or flanged to bottom wall 21 of valve box 53. The other port is connected to pipe segment 35 earlier described. Sealable closure 37 comprises flange 53 which is welded to pipe segment 35, flange 55, bolts 57, and a gasket (not shown) between the flanges. Pipe segment 51 may extend downward to the bottom of tank 3 as a dip tube or alternatively may extend via any desired piping configuration into upper region 59 of tank 3 (FIG. 4).

As described above with reference to FIG. 3, additional and optional valve 25, pipe section 27, and sealable closure 29 described earlier may be similar to valve 33, pipe segment 35, and sealable closure 37. Likewise, additional and optional valve 39, pipe section 41, and sealable closure 43 may be similar to valve 33, pipe segment 35, and sealable closure 37. The assemblies of valves, pipe segments, and sealable closures are generally installed in relation to bottom wall 21 as shown in FIG. 4, but may be oriented in any direction relative to side wall 19. For example, as shown in FIG. 3, the assembly formed by valve 33, pipe section 35, and sealable closure 37 is oriented in one direction while the assemblies formed by valves 25 and 39, pipe sections 27 and 41, and sealable closures 31 and 43 are oriented in the opposite direction.

In the embodiment described above, pipe segment 51 (FIG. 4) extends downward to the bottom of tank 3 as a dip tube and the pipe segments connected to the downward-oriented ports of valves 25 and 39 extend via any desired piping configuration into upper region 59 of tank 3. In this embodiment, pipe segment 51 may be used for liquid product fill service and the pipe segments connected to the downward-oriented ports of valves 25 and 39 (FIG. 3), which extend via any desired piping configuration into upper region 59 of tank 3, may be used for vapor withdrawal service.

Valve 49 typically is fixed in place by virtue of pipe segment 51, which is welded or flanged to the valve and to bottom cover 21 of valve box 53. Bottom cover 21 may be connected to the internal structure of tank 3 by means of bolts 61 to ring 63 which is part of cylindrical side wall 19 as earlier described. An appropriate gasket (not shown) may be installed between bottom wall 21 and ring 33. Side wall 19 is joined to top wall 67 of tank 3 via flange section 15, and threaded bolt holes 17 are disposed in flange section 15 as earlier described.

Valve box 53 can be sealed by attaching top cover 7 to flange section 15 with a gasket between (not shown) and installing threaded bolts 13 into threaded bolt holes 17. When sealed, valve box 53 encloses the valves, pipe segments, and sealable closures described above. Thus valve box 53 when sealed serves three purposes—it protects the valves, pipe segments, and sealable closures from externally-caused mechanical damage; it isolates from the atmosphere any leaks which may occur in the valves, pipe segments, and sealable closures; and it prevents possible contamination of the product in the tank by back-diffusion of atmospheric contaminants.

The combination of the valves, sealable closures, and sealed top cover described above thus provides three levels of functional isolation between the product within tank 3 and the outer atmosphere. This significantly reduces the statistical probability of a product release to the atmosphere caused by mechanical failure during transportation or storage. In addition, the three levels of functional isolation between the product within tank 3 and the outer atmosphere significantly reduces the possibility of product contamination by back-diffusion of contaminants such as water or other atmospheric components.

Preferably, valve box 53 is disposed within the periphery of tank 3 such that all valves, pipe segments, and sealable closures are disposed within this periphery. Since the periphery of tank 3 is within the periphery of framework 5, all valves, pipe segments, and sealable closures would be disposed within the periphery of framework 5.

In order to eliminate any possibility of contamination by back-diffusion of contaminants such as water or other atmospheric components through the various seal components and into tank 3, valve box 53 may be pressurized or purged (not shown) after closure with a selected inert gas during transportation and storage operations.

In one embodiment, the transportation and storage system described above can be used for high purity (contaminants up to ppmv levels) or ultra-high purity (impurities up to ppbv levels) liquefied compressed gases. Ultra-high purity gases traditionally have been transported and stored using cylinders with capacities in the range of 0.4 to 500 liters. Because of the unique design of the transportation and storage system described herein, the system can be used to transport and store ultra-high purity gases in larger volumes. For example, when using the system described above with a standard ISO frame size of 20 ft×8 ft×8 ft 6 in, up to 710 cu ft of product can be shipped and stored. This is equivalent, for example, to about 20,000 pounds of ultra-high purity ammonia. In contrast, the largest available cylinder for this service would have a capacity of 16 cu ft.

Another embodiment of the invention provides a method to monitor and detect potential contamination of the product in the tank during transportation from a filling location to an end user location or during storage at a given location. In a typical process of transporting product to the end user location, product is introduced into interior 59 of tank 3 via valve 49 and optional sealable closure 37. Sealable closure 37 and valve 49 are closed and top cover 7 is installed and sealed to valve box 53 by inserting threaded bolts 13 into threaded bolt holes 17. The tank is transported to the end user location and the steps are repeated in reverse order. During transportation, leaks may occur across sealable closure 37, closed valve 49, the point at which pipe segment 51 is attached to bottom wall 21, and the points at which bottom wall 21 is sealed to ring 63. Leaks also may occur where top cover 7 is sealed to flange section 15.

Figure 5:
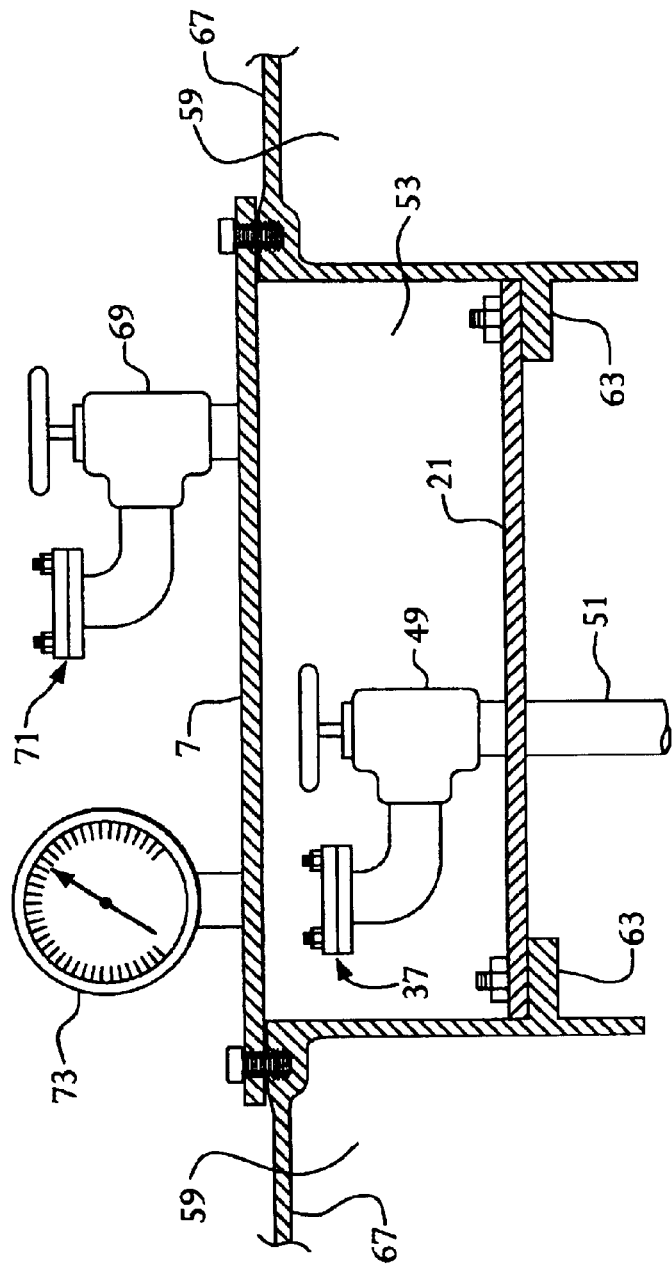
FIG. 5 is a modification of the system of FIG. 4 having a valve and pressure gauge mounted on the cover of the recessed valve box.

Such leaks are undesirable because product that leaks into valve box 53 may present a personnel hazard when top cover 7 is removed at the end user location. In addition, product may leak into the atmosphere causing additional potential hazards. Further, such leaks may allow back-diffusion of small amounts of gas from the atmosphere into valve box 53 and from the valve box into interior 59 of tank 3, thereby contaminating the product in the tank. In order to monitor for such potential leaks, the system of FIG. 4 may be modified as shown in the embodiment of FIG. 5. In this embodiment, additional valve 69 having optional sealable closure 71 is mounted on top cover 7 or an alternative location to allow flow communication between the interior of valve box 53 and the atmosphere when the sealable closure and valve are open.

Pressure gauge 73 is mounted on top cover 7 or in an alternative location to monitor the pressure within valve box 53 when valve 69 and sealable closure 71 are closed. As an alternative to pressure gauge 73, a pressure transducer or other pressure monitoring device (not shown) may be used. Optionally, a temperature measurement device (not shown), such as a thermowell with a thermometer, thermocouple, or other device, may be installed in the cover or wall of valve box 53. Optionally, an analytical device such as a thermal conductivity probe (not shown) may be installed in the cover or wall of valve box 53 for in situ measurement of the fluid composition in the valve box. Optionally, a small sample port (not shown) may be installed in top cover 7 or the wall of valve box 53 for withdrawing gas samples for external analysis by any known method.

In the embodiment of FIG. 5, valve box 53 is totally recessed within the periphery of the walls of tank 3. Alternatively, valve box 53 may be only partially recessed within the walls of tank 3. In another alternative, valve box 53 may be totally outside of the periphery of the walls of tank 3 such that bottom wall 21 of the valve box is adjacent to upper wall 67 of the tank or is part of upper wall 67. While the totally recessed valve box is preferred in the embodiment of FIG. 5, it is not a requirement. Sealable closure 37 is optional in this embodiment.

After product has been introduced into interior 59 of tank 3, valve 49 and optional sealable closure 37 are closed. Top cover 7 may be installed loosely on valve box 53 and a purge gas may be introduced through valve 69 in order to purge the valve box and displace gas originally present therein. Alternatively, valve box may be sealed and purged via purge valve 69 and a purge vent valve (not shown). The purge gas may be any gas which is not considered a contaminant if present in the product such as, for example, helium or any other inert gas. After valve box 53 has been purged and sealed, additional purge gas may be added to pressurize valve box 53, typically to a pressure higher than atmospheric pressure and lower than the pressure of the product sealed in interior 59 of tank 3. Purge valve 69 and optional sealable closure 71 are then closed.

In this embodiment, the system of FIG. 5 may be utilized to determine whether leakage has occurred in the valve box between a first time (i.e., when the valve box is initially pressurized) and a second, later time. An exemplary procedure comprises filling tank 3 with a product, for example, ultra-high purity ammonia, through sealable closure 37 and valve 49. After filling is complete, sealable closure 37 and valve 49 are closed and cover 7 is placed loosely on valve box 53. A purge gas, for example helium, is introduced through sealable closure 71 and open valve 69 to purge atmospheric air from valve box 53. When purge is complete, cover 7 is sealed while introduction of purge gas continues at a low rate until the valve box reaches a predetermined pressure that is less than the pressure in tank 3 and greater than the pressure external to the tank, e.g., atmospheric pressure. Valve 69 is then closed. The temperature of valve box 53 is measured, and the initial pressure and temperature of the valve box are recorded. Optionally, the gas in the valve box is analyzed, for example by measuring its thermal conductivity or by sampling and analyzing by other analytical means, and the composition data are recorded.

After a period of time, typically hours or days but longer if necessary, the temperature and pressure of valve box 53 are measured and recorded. Optionally, the gas in the valve box is analyzed, for example by measuring its thermal conductivity or by sampling and analyzing by other analytical means, and the composition data are recorded. During this time period, the entire tank assembly may be transported to another location such as, for example, the site of an end user of the product stored in tank 3. Alternatively, the tank assembly may be stored without moving for a period of time.

During this time period, several alternative scenarios are possible:

(1) The pressure in valve box 53 at the end of the time period (after temperature compensation if necessary) is higher than that recorded at the beginning of the time period as a result of leakage from the tank into the valve box. In this scenario, some product will be found in the valve box because of leakage driven by a pressure gradient between the tank and valve box. In addition, a small quantity of purge gas may be found in tank 3 as a result of back diffusion driven by a concentration gradient between the valve box and the interior of the tank. In this scenario, leakage also may have occurred between the valve box and the surrounding atmosphere, but at a lower rate that the leakage from the product tank into the valve box. If this has occurred, a small quantity of gas from the surrounding atmosphere may have back-diffused into the valve box and from the valve box into the product tank. The amount of back-diffusion, however, is much smaller than the back-diffusion that would occur if the valve box were fully exposed to atmospheric contaminants. The potential for product contamination by atmospheric back-diffusion is significantly reduced by the introduction of the buffer or purge gas into valve box 53.

(2) The pressure in valve box 53 at the end of the time period (after temperature compensation if necessary) is lower than that recorded at the beginning of the time period as a result of leakage from the valve box into the atmosphere. In this scenario, some of the purge gas in valve box 53 may have leaked to the surrounding atmosphere because valve box cover 7 was not securely sealed. If no leakage has occurred between tank 3 and valve box 53, no product will be present in the valve box and no back-diffusion will have occurred into the product in tank 3. In this scenario, however, leakage also may have occurred between the tank and the valve box, but at a lower rate that the leakage from the valve box to the surrounding atmosphere. This possibility may be checked by analyzing the gas in the valve box to determine if any product is present therein. If this has occurred, a small amount of gas from the surrounding atmosphere possibly may have back-diffused into the valve box and back-diffused from the valve box into the product tank. Back-diffusion of atmospheric contaminants into tank 3 will be small, however, since the valve box eventually will fill with the product contained in tank 3 and will approach atmospheric pressure. Analyzing the gas in the valve box will determine whether a leak occurred between tank 3 and valve box 53.

(3) The pressure in valve box 53 at the end of the time period (after temperature compensation if necessary) is equal to that recorded at the beginning of the time period as a result of leakage from the tank into the valve box. In this scenario, it is most likely that no leakage has occurred and therefore no back-diffusion has occurred to contaminate the product in tank 3. However, there is a finite but very small possibility that some of the purge gas in valve box 53 may have leaked to the surrounding atmosphere because valve box cover 7 was not securely sealed and also that leakage may have occurred between the tank and the valve box at a rate equal to the leakage from the valve box to the surrounding atmosphere. This possibility, while unlikely, may be checked by analyzing the gas in the valve box to determine if any product is present therein. If this has occurred, some gas from the surrounding atmosphere possibly may have back-diffused into the valve box and back-diffused from the valve box into the product tank. The possible contamination of the product in tank 3 by back-diffusion through valve box 53 will be significantly reduced when the valve box is filled with product or a mixture of product and purge gas.

Temperature compensation will be required when the initial and final temperatures of the valve box are different and this may be accomplished by multiplying the final pressure by the ratio of the initial absolute temperature to the final absolute temperature. The term "temperature-compensated pressure" as used herein means a pressure that has been corrected for temperature difference as described. A low-cost thermal conductivity meter may be used for real-time purge gas analyses to provide immediate confirmation of leakage in the above scenarios. Alternatively or additionally, finite gas samples may be taken via a sample port in the valve box and analyzed externally by any appropriate analytical method.

The scenarios described above may be used to make operational decisions in the delivery of ultra-high purity products from a product fill location to an end user location utilizing modular tank and frame system 1 fitted with the valve box assembly of FIG. 5. For example, a vendor who sells an ultra-high purity product and an end user who purchases the ultra-high purity product may devise operating procedures to ensure that the end user receives an ultra-high purity product and will not be exposed to potentially hazardous contact with the ultra-high purity product when removing valve box cover 7. Such procedures may include the following exemplary steps.

Scenario (1) Ultra-pure product is delivered to the end user in modular tank and frame system 1 fitted with the valve box assembly of FIG. 5. The end user measures the pressure in valve box 53 upon receipt and compares it (after temperature compensation if necessary) to the pressure recorded by the vendor when the product was shipped. The pressure in the valve box as received is found to be higher than the pressure in the valve box when shipped, indicating leakage from the tank into the valve box. In this scenario, the modular tank and frame system is shipped back to the vendor's facility for further investigation of the problem and appropriate repair.

Scenario (2) Ultra-pure product is delivered to the end user in modular tank and frame system 1 fitted with the valve box assembly of FIG. 5. The end user measures the pressure in valve box 53 upon receipt and (after temperature compensation if necessary) finds that the pressure in the valve box as received is lower than the pressure in the valve box when shipped, indicating that some of the purge gas in valve box 53 may have leaked to the surrounding atmosphere because valve box cover 7 was not securely sealed. In order to determine if leakage has occurred between tank 3 and valve box 53, the vapor in valve box 3 is analyzed to determine if product is present. If no product is present in the valve box, the end user will remove valve box cover 7, connect his product withdrawal system to sealable closure 37, and open valve 49. If product is present in valve box 53, the modular tank and frame system may be shipped back to the vendor's facility for further investigation of the problem and appropriate repair.

Scenario (3) Ultra-pure product is delivered to the end user in modular tank and frame system 1 fitted with the valve box assembly of FIG. 5. The end user measures the pressure in valve box 53 upon receipt and (after temperature compensation if necessary) finds that the pressure in the valve box as received is essentially equal to (i.e., varies by no more than the known variability of the pressure measurement device) the pressure in the valve box when shipped. This means most likely that no leakage of product into valve box 53 has occurred. However, there is a finite but very small possibility that some of the purge gas in valve box 53 may have leaked to the surrounding and also that product may have leaked from the tank into the valve box at a rate equal to the leakage from the valve box to the surrounding atmosphere. Depending upon the end user's risk tolerance, he can either (a) conclude there is no problem, open the valve box, connect his product withdrawal system to sealable closure 37, and open valve 49 or (b) analyze the vapor in valve box 3 to determine if product is present. If no product is present in the valve box, the end user can remove valve box cover 7, connect his product withdrawal system to sealable closure 37, and open valve 49. If product is present in valve box 53, the modular tank and frame system may be shipped back to the vendor's facility for further investigation of the problem and appropriate repair.

Materials for the equipment used in any of the above embodiments should be compatible with the product contained and may be selected from known corrosion-resistant materials. Preferred materials for handling ultra-pure products such as ammonia, chlorine, hydrogen chloride, silicon tetrachloride, and trichlorosilane include stainless steel, Hastelloy® (Haynes International, Inc.), carbon steel, and Monel® (Inco Alloys International, Inc.).

EXAMPLE

The system illustrated in FIGS. 1–5 is constructed for the transportation and storage of high purity ammonia. Valve 33, pipe segment 35, and sealable closure 37 are designed for filling tank 3 with high purity liquid ammonia having a maximum water concentration of 1 ppmv. In this application, pipe segment 51 (FIG. 4) extends to the bottom of tank 3. Valve 25, pipe segment 27, and sealable closure 31 (FIG. 3) are designed for vapor withdrawal service, wherein the pipe segment attached to the downward-directed port of valve 25 extends through bottom wall 21 and is placed in direct flow communication with the vapor head space in the upper region 59 of tank 3. Likewise, valve 39, pipe segment 41, and sealable closure 43 (FIG. 3) are designed for vapor withdrawal service, and the pipe segment attached to the downward-directed port of valve 39 extends through bottom wall 21 and is placed in direct flow communication with the vapor space in the vapor head space in the upper region 59 of tank 3.

Top cover 7 and the top flanges of sealable closures 29, 37, and 43 are removed, valves 25, 33, and 39 are opened, and the tank is cleaned and purged in preparation for liquid loading. A liquid fill line is attached to closure 37 and liquid product is introduced into tank 3 to the desired level wherein the tank contains 25,000 pounds of product. Valves 25, 33, and 39 are closed, the fill line is disengaged, and the top flanges of sealable closures 29, 37, and 43 are installed and sealed. Top cover 7 is installed and sealed.

The system is transported to a consumer and stored at the consumer's location for a period of time. When the demand for product from the system begins, top cover 7 and the top flange of sealable closure 29 are removed, a product withdrawal line is attached to closure 29, and the line is purged to remove residual air. Valve 25 is opened to deliver vapor product via the product withdrawal line to final use. Valve 39, pipe segment 41, and sealable closure 43 are held in reserve for use if product demand increases beyond that supplied by valve 25 or in the event of a leak or failure in valve 25 and associated piping.

What is claimed is:

1. A system for the transportation and storage of a product, which system comprises:
   (a) a tank including cylindrical wall section and two ends, wherein the cylindrical wall section and two ends define a cylindrical tank periphery, and wherein the tank periphery has an interior and an exterior;
   (b) a valve box including one or more side walls, a bottom wall, and a removable, sealable top cover which can be attached to the one or more side walls to seal the valve box, wherein the valve box side walls are sealably joined to the cylindrical wall;
   (c) one or more process valves disposed in the valve box, wherein each valve has a first and a second end, wherein each first end is connected to a pipe which passes through a wall of the valve box for introducing product into the tank or withdrawing product from the tank; and
   (d) a purge valve and pressure measurement means in fluid communication with the valve box;
wherein the product in the tank is isolated from the atmosphere surrounding the tank when the valve box is sealed.

2. The system of claim 1 wherein the valve box is at least partially recessed and is at least partially disposed in the interior of the tank periphery, and wherein the valve box cover, when attached to the one or more side walls of the valve box to form a sealed valve box, is disposed at the tank periphery or is exterior to the tank periphery.

3. The system of claim 2 wherein the sealed valve box is isolated from the atmosphere surrounding the tank.

4. The system of claim 1 which further comprises temperature measurement means for determining the temperature in the valve box.

5. The system of claim 1 wherein the valve box is cylindrical and has a circular bottom wall, a circular top cover, and a cylindrical center portion forming a single side wall.

6. The system of claim 1 wherein the purge valve is connected to a sealable closure which can be connected to a fill line for introducing purge gas into the valve box.

7. The system of claim 6 wherein the maximum allowable working pressure of the valve box when sealed is equal to or greater than the maximum allowable working pressure of the tank.

8. The system of claim 1 wherein each second end of the one or more process valves is connected to a sealable closure which can be connected to a fill line for introducing product into the tank from an external source, connected to a withdrawal line for withdrawing product from the tank for external use, or sealed closed for transportation or storage of the product in the tank.

9. The system of claim 8 wherein each sealable closure is disposed in the valve box and within the tank periphery.

10. The system of claim 8 wherein the tank contains product in coexisting liquid and vapor phases, wherein a fill line is adapted for introducing liquid into the tank and a withdrawal line is adapted for withdrawing vapor from the tank.

11. The system of claim 10 wherein the tank contains a product selected from the group consisting of ammonia, chlorine, hydrogen chloride, trichlorosilane, silicon tetrachloride, and methyltrichlorosilane.

12. The system of claim 8 wherein the tank contains a solid particulate component and gas, wherein the fill line is adapted for introducing a mixture of the solid particulate component and gas into the tank and the withdrawal line is adapted for withdrawing a mixture of the solid particulate component and gas from the tank.

13. The system of claim 8 wherein the tank contains a slurry of a solid particulate component and a liquid component, wherein the fill line is adapted for introducing a slurry of the solid particulate component and the liquid component into the tank and the withdrawal line is adapted for withdrawing a slurry of the solid particulate component and the liquid from the tank.

14. The system of claim 1 wherein the axis of the tank is generally horizontal, the tank has a top and a bottom, the valve box is disposed in the top of the tank, and a pipe connected to the first end of a valve forms a dip tube which extends through and downward from the valve box to a location adjacent the bottom of the tank.

15. The system of claim 1 which further comprises a rigid framework surrounding the tank and valve box, wherein the framework is attached to and supports the tank, and wherein the framework defines a periphery which encloses the periphery of the tank.

16. The system of claim 11 wherein the valve box is disposed within the periphery of the rigid framework.

17. The system of claim 1 which further comprises analytical means for analyzing fluid withdrawn from the valve box when the valve box is sealed or for analyzing fluid in situ in the valve box when the valve box is sealed.

18. A method for the transportation of a product, which method comprises:
   (a) providing a system which comprises
      (1) a tank including a cylindrical wall section and two ends, wherein the cylindrical wall section and two ends define a cylindrical tank periphery, and wherein the periphery has an interior and an exterior;
      (2) a valve box including one or more side walls, a bottom wall, and a removable and sealable top cover which can be attached to the one or more side walls to form a sealed valve box, wherein the valve box side walls are sealably joined to the cylindrical wall section;
      (3) one or more process valves disposed in the valve box, wherein each valve has a first and a second end, wherein each first end is connected to a pipe which passes through a wall of the valve box for introducing product into the tank or withdrawing product from the tank, and wherein product in the tank is isolated from the atmosphere surrounding the tank when the valve box is sealed; and
      (4) a purge valve and pressure measurement means in fluid communication with the valve box;
   (b) introducing product into the tank through at least one of the one or more process valves, through a pipe connected to the first end of the process valve, which pipe passes through the wall of the valve box and into the tank;
   (c) closing the one or more process valves, thereby isolating the product in the tank at a product pressure, and attaching the sealable top cover to the one or more side walls of the valve box;
   (d) at a first time, purging the valve box with a purge gas, pressurizing the valve box to a pressure between the product pressure and atmospheric pressure, closing the purge valve, and measuring and recording the pressure in the valve box; and
   (e) at a second time later than the first time, measuring the pressure in the valve box and comparing the pressure at the second time to the pressure in the valve box measured in (d) at the first time.

19. The method of claim 18 wherein the system further comprises a rigid framework surrounding the tank and valve box, wherein the framework is attached to and supports the tank, and wherein the framework defines a periphery which encloses the periphery of the tank.

20. The method of claim 19 wherein the valve box is disposed within the periphery of the rigid framework.

21. The method of claim 18 which further comprises transporting the system from a first location to a second location during a time period between the first time and the second time.

22. The method of claim 21 which further comprises measuring the temperature in the valve box at the first and second locations, correcting the pressure at the second location to yield a temperature-corrected pressure at the second location, and comparing the temperature-corrected pressure at the second location with the pressure measured at the first location.

23. The method of claim 22 wherein when the temperature-corrected pressure in the valve box at the second location is greater than the pressure measured in the valve box at the first location, transporting the system from the second location to the first location.

24. The method of claim 22 wherein when the temperature-corrected pressure in the valve box at the second location is less than the pressure measured in the valve box at the first location, analyzing the fluid in the valve box, and if the fluid in the valve box contains product, transporting the system from the second location to the first location.

25. The method of claim 22 wherein when the temperature-corrected pressure in the valve box at the second location is essentially equal to the pressure measured in the valve box at the first location, analyzing the fluid in the valve box, and if the fluid in the valve box contains product, transporting the system from the second location to the first location.

* * * * *